United States Patent
Wang et al.

(10) Patent No.: US 11,630,014 B2
(45) Date of Patent: Apr. 18, 2023

(54) HIGH-SENSITIVITY AIR PRESSURE SENSOR BASED ON SUSPENDED-CORE FIBER AND SIDE-HOLE FIBER

(71) Applicant: Guangdong Ocean University, Zhanjiang (CN)

(72) Inventors: Ji Wang, Zhanjiang (CN); Yuqiang Yang, Zhanjiang (CN); Fang Song, Zhanjiang (CN); Jingdong Lin, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 17/669,816

(22) Filed: Feb. 11, 2022

(65) Prior Publication Data

US 2022/0236129 A1 Jul. 28, 2022

Related U.S. Application Data

(63) Continuation of application No. PCT/CN2021/126881, filed on Oct. 28, 2021.

(30) Foreign Application Priority Data

Jan. 25, 2021 (CN) .................... CN202110094621.0

(51) Int. Cl.
*G01L 9/00* (2006.01)
*G01J 3/26* (2006.01)

(52) U.S. Cl.
CPC .............. *G01L 9/0079* (2013.01); *G01J 3/26* (2013.01)

(58) Field of Classification Search
CPC ......... G01L 9/0079; G01L 11/025; G01J 3/26
See application file for complete search history.

(56) References Cited

U.S. PATENT DOCUMENTS

2021/0381858 A1* 12/2021 Lindner ............. G01D 5/35341

* cited by examiner

*Primary Examiner* — Hina F Ayub
(74) *Attorney, Agent, or Firm* — WPAT, PC

(57) ABSTRACT

An air pressure sensor based on a suspended-core fiber and a side-hole fiber is provided and includes a broadband light source, an optical fiber circulator, a sensing head and a spectrometer; the optical fiber circulator is connected with the broadband light source, the sensing head and the spectrometer; the sensing head includes a single mode fiber, a multimode fiber, the suspended-core fiber and the side-hole fiber; the single mode fiber is connected with the suspended-core fiber through the multimode fiber; and the multimode fiber is connected with the side-hole fiber through the suspended-core fiber. The sensor uses a fabrication method of fiber fusion, and the operation is simple; the sensor has advantages of small volume, compact structure and convenient use; the sensor has good stability without adhesive; additionally, parallel connection of double cavities could produce vernier effects, so the sensor has good contrast of interference spectrum and high sensitivity.

1 Claim, 3 Drawing Sheets

HIGH-SENSITIVITY AIR PRESSURE SENSOR BASED ON SUSPENDED-CORE FIBER AND SIDE-HOLE FIBER

TECHNICAL FIELD

The invention belongs to the field of optical fiber sensing, and relates to a high-sensitivity air pressure sensor based on a suspended-core fiber and a side-hole fiber.

BACKGROUND

Air pressure measurement is widely used in medical and health, instruments and meters, barometers and other industrial equipment. The optical fiber air pressure sensor based on Fabry-Perot interferometer (FPI) has the advantages that electronic air pressure sensors do not have, such as of small sizes, light weight, no electromagnetic interference, corrosion resistance, high measurement accuracy and applicability to various extreme environments, which has attracted extensive attention of researchers. FPI air pressure sensors are mainly classified into two types. The first type is to measure the air pressure by measuring the change of the cavity length of FP cavity. These sensors are classified into thin-film type sensors and fiber bubble type sensors, both of which have the shortcomings of fragile structure and easy breakage. The second type is to measure the air pressure by measuring the change of refractive index in the optical fiber air cavity. This type of air pressure sensor is usually fabricated by fusing microstructure fiber. The air holes of microstructure fiber are used to form an open-air cavity, and the air pressure sensitivity of a single open-air cavity is about 3.9 nanometers per megapascals (nm/Mpa). The double-cavity cascade vernier effect can further improve the sensitivity of air pressure measurement, which can be improved by 1-2 orders of magnitude. However, at present, air cavity and silica cavity are connected in series in double-cavity cascade, which leads to large incident light loss and low contrast of interference spectrum.

SUMMARY

In order to solve the above problems, the invention provides a high-sensitivity air pressure sensor based on a suspended-core fiber and a side-hole fiber, including:

a broadband light source, an optical fiber circulator, a sensing head and a spectrometer;

the optical fiber circulator is connected with the broadband light source, the sensing head and the spectrometer;

the sensing head includes a single mode fiber, a multimode fiber, the suspended-core fiber and the side-hole fiber;

the single mode fiber is connected to the suspended-core fiber through the multimode fiber;

and the multimode fiber is connected to the side-hole fiber through the suspended-core fiber.

In an embodiment, a wave band of the broadband light source is 1200 nanometers (nm) to 1600 nm.

In an embodiment, the optical fiber circulator includes a first end of the optical fiber circulator, a second end of the optical fiber circulator and a third end of the optical fiber circulator; the first end of the optical fiber circulator is connected to the broadband light source; the second end of the optical fiber circulator is connected to the sensing head; the third end of the optical fiber circulator is connected to the spectrometer; the broadband light source transmits the wave band signal to the sensing head for processing through the first end of the optical fiber circulator; and the sensing head transmits the processed wave band signal (also referred to as wave band signal after the processing) to the spectrometer through the second end of the optical fiber circulator.

In an embodiment, the single mode fiber includes a first fiber core; the multimode fiber includes a second fiber core; the suspended-core fiber includes a third fiber core and a first air hole; the side-hole fiber includes a fourth fiber core and a second air hole.

In an embodiment, the single mode fiber and the multimode fiber are fused without dislocation.

In an embodiment, the length of the multimode fiber is 50-150 micrometers (μm).

In an embodiment, the multimode fiber and the suspended-core fiber are fused with a dislocation amount of is 10-30 μm;

the second fiber core is connected to the third fiber core and the first air hole.

In an embodiment, the length of the suspended-core fiber is 200-300 μm.

In an embodiment, the suspended-core fiber and the side-hole fiber are fused with dislocation; the third fiber core and the fourth fiber core are connected core-to-core; and the first air hole and the second air hole are connected with dislocation.

In an embodiment, the lengths of the third fiber core and the fourth fiber core satisfy that the sum of the optical paths of the incident light transmitted in the third fiber core and the fourth fiber core is 1.9-1.99 times or 2.01-2.10 times of the optical path of the incident light transmitted in the first air hole.

The invention has the positive effects that:

the sensor according to the invention adopts the fabrication method of fiber fusion, and the operation is simple; the sensor has advantages of a small volume, compact structure and convenient use; the sensor does not need adhesive and has good stability; in addition, parallel connection of double cavities can produce vernier effect, so the sensor has good contrast of interference spectrum and high sensitivity.

DETAILED DESCRIPTION OF THE EMBODIMENTS

Figure 1:
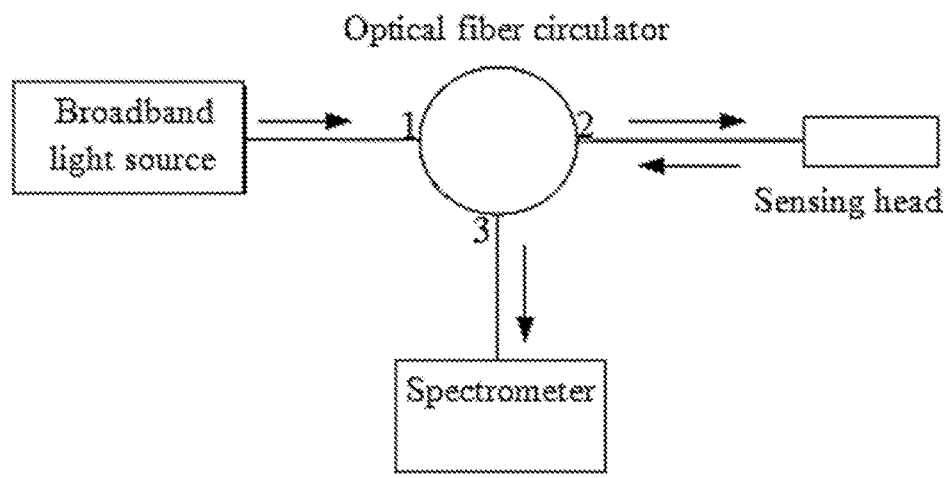
FIG. 1 is a schematic diagram of a sensing system according to the invention.

In order to make the purpose, technical scheme and advantages of embodiments of the application clearer, the technical scheme in the embodiments of the application will be clearly and completely described with reference to the drawings in the embodiments. Obviously, the described embodiments are only part of the embodiments of the application, not all of the embodiments. Components of the embodiments of the application, which are generally described and shown in the drawings herein, can be arranged and designed in various different configurations. Therefore, the following detailed description of the embodiments of the application provided in the accompanying drawings is not intended to limit the scope of the claimed application, but only represents selected embodiments of the application. Based on the embodiments of this application, all other embodiments obtained by technicians in the field without paying creative efforts are within the scope of protection of this application.

The technical problem to be solved by the invention is to provide an all-fiber air pressure sensor based on vernier effect sensitization, which is simple to fabricate and does not need expensive equipment. The fabricated fiber double-cavity is of parallel structure, which can not only realize the vernier effect, but also regulate the proportion of incident light in the double-cavity, thus improving the contrast of interference spectrum. Compared with a single open air cavity, the sensor sensitivity is improved by 1-2 orders of magnitude.

As shown in FIG. 1, the invention provides a high-sensitivity air pressure sensor based on a suspended-core fiber and a side-hole fiber, which includes a broadband light source, an optical fiber circulator, a sensing head and a spectrometer; the optical fiber circulator is connected with the broadband light source, the sensing head and the spectrometer; the sensing head includes a single mode fiber, a multimode fiber, the suspended-core fiber and the side-hole fiber; the single mode fiber is connected with the suspended-core fiber through the multimode fiber; the multimode fiber is connected with the side-hole fiber through the suspended-core fiber, and the broadband light source has a wave band of 1200 nm-1600 nm; the optical fiber circulator includes a first end of the optical fiber circulator, a second end of the optical fiber circulator and a third end of the optical fiber circulator; the first end of the optical fiber circulator is connected with the broadband light source; the second end of the optical fiber circulator is connected with the sensing head; the third end of the optical fiber circulator is connected with the spectrometer; the broadband light source transmits the wave band signal to the sensing head for processing through the first end of the optical fiber circulator; the sensing head transmits the processed wave band signal to the spectrometer through the second end of the optical fiber circulator.

The single mode fiber includes a first fiber core; the multimode fiber includes a second fiber core; the suspended-core fiber includes a third fiber core and a first air hole; the side-hole fiber includes a fourth fiber core and a second air hole.

The single mode fiber and multimode fiber are fused core-to-core; the first fiber core and the second fiber core are connected core-to-core. The length of the multimode fiber is 50-150 µm.

The multimode fiber and the suspended-core fiber are fused with a dislocation amount of is 10-30 µm; the second fiber core is connected with the third fiber core and the first air hole. The length of the suspended-core fiber is 200-300 µm.

The suspended-core fiber and the side-hole fiber are fused with dislocation; the third fiber core and the fourth fiber core are connected core-to-core; and the first air hole and the second air hole are connected with dislocation.

The lengths of the third fiber core and the fourth fiber core satisfy that the sum of the optical paths of the incident light transmitted in the third fiber core and the fourth fiber core is 1.9-1.99 times or 2.01-2.10 times of the optical path of the incident light transmitted in the first air hole.

As shown in FIG. 1, the sensor consists of a broad-spectrum light source (1200 nm-1600 nm), an optical fiber circulator, a sensing head and a spectrometer.

Figure 2:
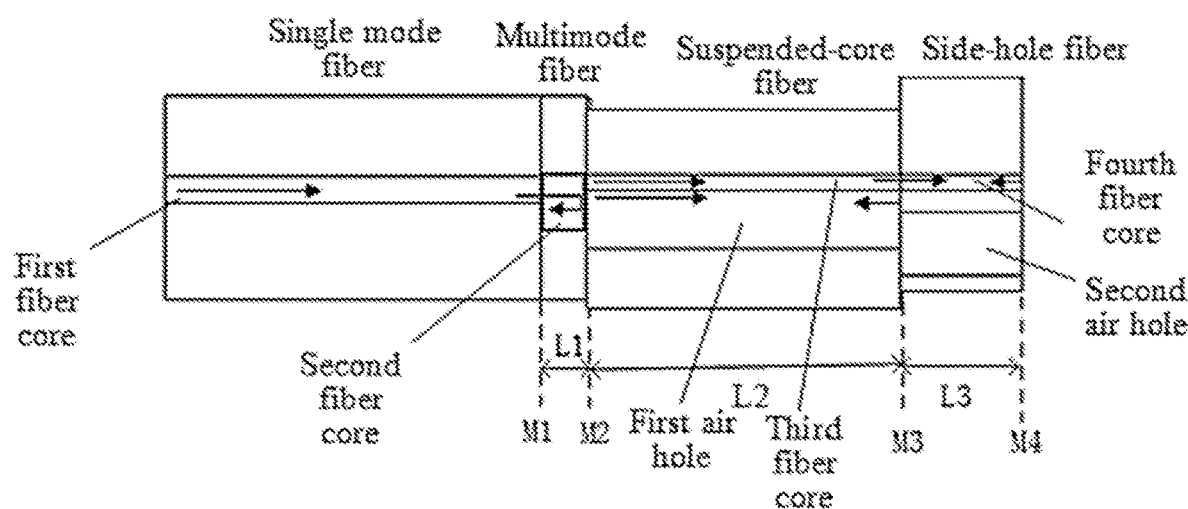
FIG. 2 is a schematic diagram of a sensing head according to the invention.
Figure 3:
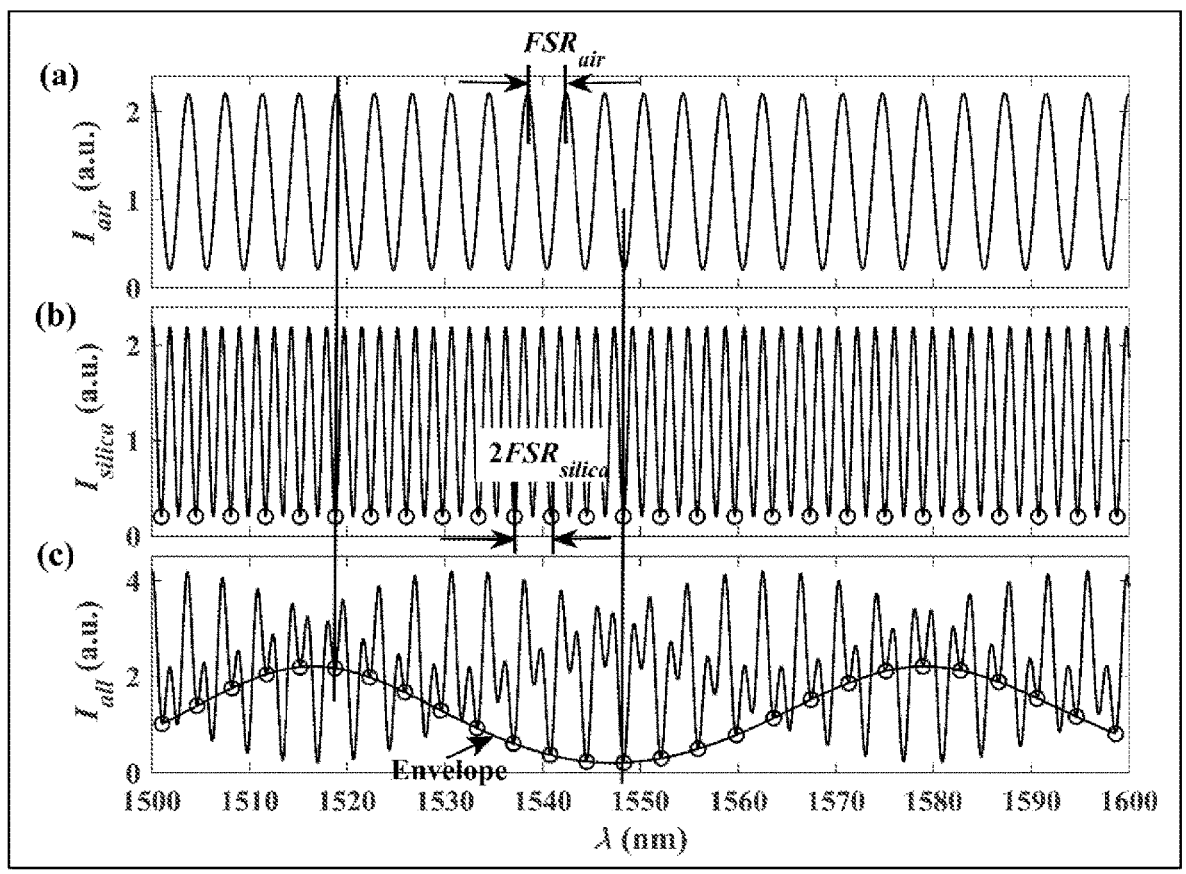
FIG. 3 is a schematic diagram of the generation of interference spectrum envelope according to the invention, in which (a) air cavity interference spectrum; (b) silica cavity interference spectrum; and (c) parallel interference spectrum.

As shown in FIG. 2, the sensing head structure consists of a section of the multimode fiber, a section of the suspended-core fiber and a section of the side-hole fiber which are fused at one end of the single mode fiber in sequence. The outer diameters of the single mode fiber, the multimode fiber, the suspended-core fiber and the side-hole fiber are all 125 µm, the fiber core diameters of the single mode fiber, the suspended-core fiber and the side-hole fiber are all 10 µm, and the fiber core diameter of the multimode fiber is 30-50 µm; the air hole of the suspended-core fiber is located at the center of the cross section with a diameter of 50 µm; the fiber core of the suspended-core fiber is located at the edge of the air hole, partially exposed to the air; and the fiber core of the side-hole fiber is located at the center of the cross section, and the side-hole diameter is 50 µm, and the distance between the center of the side-hole and the center of the fiber core is 50 µm.

The fabrication process of the sensing head: fusing the single mode fiber and the multimode fiber without dislocation, and then cutting the multimode fiber to a length of 50-150 µm;

fusing the cutting end of the multimode fiber with the suspended-core fiber with a dislocation amount of 10-30 µm to ensure that the fiber core and air hole of the suspended-core fiber are partially overlapped with the fiber core of the multimode fiber, so that one part of the incident light enters the fiber core of the suspended-core fiber and the other part enters the air hole of the suspended-core fiber, and then cutting the suspended-core fiber to a length of 200-300 µm;

and fusing the cut suspended-core fiber and the side-hole fiber with dislocation; subsequently, the fiber core of the suspended-core fiber overlaps with the fiber core of the side-hole fiber, and the air holes of the suspended-core fiber and the side-hole fiber partially overlap, so as to make the outside air enter the air hole of the suspended-core fiber and measure the outside air pressure; and then cutting the side-hole fiber, and the cut length is determined by the length of the suspended-core fiber, ensuring that the optical path of incident light transmitted in the suspended-core fiber and the side-hole fiber core is about twice times of the optical path transmitted in the suspended core air hole, so as to produce the vernier effect of the incident light.

Embodiment 1

The incident light enters the multimode fiber from the single mode fiber, and then expanded in the multimode fiber (the function of the multimode fiber is to reduce the precision requirement of the dislocation amount when the suspended-core fiber is fused with dislocation); part of the incident light is reflected by the interface M2 formed by the multimode fiber and the air hole of the suspended-core fiber, and is received by the spectrometer after passing through the fiber coupler, while the other part of the light enters the suspended-core fiber; the incident light entering the suspended-core fiber is divided into two beams in the suspended-core fiber, one beam is transmitted in the fiber core and the other beam is transmitted in the air hole; the light beam transmitted in the fiber core of the suspended core enters the fiber core of the side-hole fiber, and then part of the light beam is reflected back to the sensing head from the interface M4 of the single mode fiber, and is received by the spectrometer after passing through the optical fiber circulator; part of the light beam transmitted in the air hole of the suspended-core is reflected back to the sensing head by the interface M3 formed by the air hole of the suspended-core fiber and the side-hole fiber, and then received by the spectrometer after passing through the fiber coupler. Therefore, interfaces M2 and M3 constitute the fiber air cavity, and interfaces M2 and M4 constitute the fiber silica cavity. The interference spectra of the double cavities are respectively expressed as:

$$\begin{cases} I_{air}(\lambda) = 2AB\cos\left(\frac{4n_{air}\pi L_2}{\lambda}\right) \\ I_{silica}(\lambda) = 2AC\cos\left(\frac{4n_{silica}\pi(L_2 + L_3)}{\lambda}\right) \end{cases};$$

in which $\lambda$ represents the incident light wavelength, $I_{air}(\lambda)$ and $I_{silica}(\lambda)$ represent the interference spectra of the air cavity and the silica cavity respectively, A, B and C represent the complex amplitudes of reflected light reflected back to the spectrometer by interfaces M2, M3 and M4 respectively, $L_2$, $L_2+L_3$ represent the lengths of air cavity and silica cavity respectively, and $n_{air}$ and $n_{silica}$ represent the refractive indices of air cavity and silica cavity respectively. The air cavity and the silica cavity form a parallel structure, and the spectrum received by the spectrometer is the superposition of interference spectra of the air cavity and the silica cavity, which is expressed as:

$$I_{all}(\lambda) = I_{air}(\lambda) + I_{silica}(\lambda).$$

Figure 4:
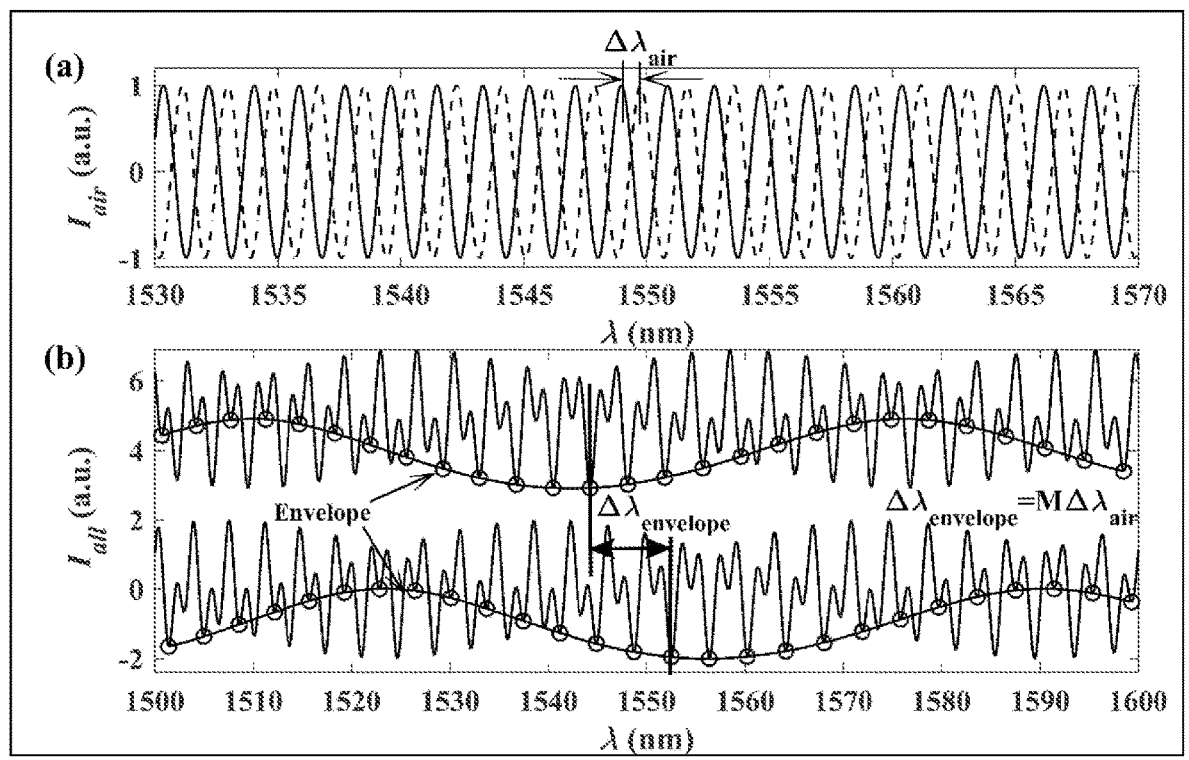
FIG. 4 is a schematic diagram of the vernier effect according to the invention, in which (a) spectral shift of air cavity; (b) spectral shift of interference spectrum envelope.

When the length optical path $n_{silica}(L_2+L_3)$ of the silica cavity is about twice the optical path $n_{air}L_2$ of the air cavity, but not equal to twice (that is, the free spectral range $FSR_{air}$ of the air cavity is about twice the free spectral range $FSR_{silica}$ of the silica cavity, but not equal to twice), the interference spectrum of the double parallel cavities will generate an envelope, as shown in FIG. 4, which can be expressed as:

$$I_{envelope}\int(\lambda) = D\cos\left(\frac{4\pi n_{air}L_2}{M\lambda}\right)$$

$$M = \frac{2n_{air}L_2}{n_{silica}(L_2 + L_3) - 2n_{air}L_2};$$

in which, M represents the magnification factor. When the outside air pressure changes, the refractive index in the air hole of the suspended-core fiber changes, resulting in the interference spectrum shift of the air cavity. Since the free spectral range of the silica cavity is about 2 times that of the air cavity, but it is not equal to 2 times, the parallel interference spectrum of the double cavities will produce vernier effect, that is, when the interference spectrum of the air cavity is shifted under the action of air pressure, the shift amount of the parallel interference spectrum envelope is M times that of a single air cavity, as shown in FIG. 5. The air pressure sensitivity $S_{air}$ of a single air cavity can be expressed as:

$$S_{air} = \frac{d\lambda}{dP} = \frac{\alpha\lambda_m}{n_{air}};$$

in which $\alpha$ represents the change rate of gas refractive index with air pressure, and $\lambda_m$ represents the peak wavelength. The air pressure sensitivity $S_{envelope}$ of the parallel double-cavity sensor can be expressed as:

$$S_{envelope} = \frac{M\alpha\lambda_m}{n_{air}}.$$

After the double cavities are connected in parallel, the temperature sensitivity of a parallel double-cavity sensor is M times that of a single air cavity. Assuming that the peak wavelength is $\lambda_m$=1550 nm, the air refractive index $n_{air}$=1, the magnification M=50 and the coefficient $\alpha$=2.5×10$^{-3}$/MPa the air pressure sensitivity of a single air cavity is about 3.88 nm/MPa, and the temperature sensitivity of a parallel double-cavity sensor is 193.75 nm/MPa.

The invention provides an all-fiber air pressure sensor based on vernier effect sensitization, which is simple to fabricate and does not need expensive equipment. The fabricated double fiber cavities are of parallel structure, which can not only realize vernier effect, but also regulate the proportion of incident light in the double cavities, thereby improving the contrast of interference spectrum. Compared with a single open air cavity, the sensor sensitivity is improved by 1-2 orders of magnitude.

Finally, it should be noted that the above-mentioned embodiments are only concrete embodiments of the invention, which are used to illustrate the technical schemes of the invention, but not to limit it, and the scope of protection of the invention is not limited to this. Although the invention has been described in detail with reference to the above embodiments, those skilled in the art should understand that any person skilled in the art can still modify or easily think of changes to the technical schemes recorded in the above embodiments, or equivalent replace some of the technical features within the technical scope disclosed by the invention; these modifications, changes or substitutions do not separate the essence of the corresponding technical scheme from the spirit and scope of the technical scheme of the embodiment of the invention, and should be covered within the scope of protection of the invention. Therefore, the scope of protection of the invention should be based on the scope of protection of the claims.

What is claimed is:

1. An air pressure sensor based on a suspended-core fiber and a side-hole fiber, comprising: a broadband light source, an optical fiber circulator, a sensing head and a spectrometer;
   wherein the optical fiber circulator is connected to the broadband light source, the sensing head and the spectrometer;
   wherein the sensing head comprises a single mode fiber, a multimode fiber, the suspended-core fiber and the side-hole fiber, the single mode fiber is connected to the suspended-core fiber through the multimode fiber, and the multimode fiber is connected to the side-hole fiber through the suspended-core fiber;
   wherein a wave band of the broadband light source is in a range from 1200 nanometers (nm) to 1600 nm;
   wherein the optical fiber circulator comprises a first end of the optical fiber circulator, a second end of the optical fiber circulator and a third end of the optical fiber circulator, the first end of the optical fiber circulator is connected to the broadband light source, the second end of the optical fiber circulator is connected to the sensing head, and the third end of the optical fiber circulator is connected to the spectrometer;

wherein the broadband light source is configured to transmit a wave band signal to the sensing head for processing through the first end of the optical fiber circulator;

wherein the sensing head is configured to transmit the wave band signal after the processing to the spectrometer through the second end of the optical fiber circulator;

wherein the single mode fiber comprises a first fiber core;

wherein the multimode fiber comprises a second fiber core;

wherein the suspended-core fiber comprises a third fiber core and a first air hole;

wherein the side-hole fiber comprises a fourth fiber core and a second air hole;

wherein the single mode fiber and the multimode fiber are fused without dislocation;

wherein a length of the multimode fiber is in a range from 50 micrometers (μm) to 150 μm;

wherein the multimode fiber and the suspended-core fiber are fused with a dislocation amount of 10-30 μm;

wherein the second fiber core is connected to the third fiber core and the first air hole;

wherein a length of the suspended-core fiber is in a range from 200 μm to 300 μm;

wherein the suspended-core fiber and the side-hole fiber are fused with dislocation;

wherein the third fiber core is connected to the fourth fiber core-to-core;

wherein the first air hole and the second air hole are connected with dislocation;

wherein lengths of the third fiber core and the fourth fiber core satisfy that a sum of optical paths of an incident light transmitted in the third fiber core and the fourth fiber core is 1.9-1.99 times or 2.01-2.10 times of an optical path of the incident light transmitted in the first air hole;

wherein outer diameters of the single mode fiber, the multimode fiber, the suspended-core fiber and the side-hole fiber are 125 μm;

wherein fiber core diameters of the single mode fiber, the suspended-core fiber and the side-hole fiber are 10 μm, and a fiber core diameter of the multimode fiber is 30-50 μm;

wherein the first air hole of the suspended-core fiber is located at a center of a cross section of the suspended-core fiber with a diameter of 50 μm; and the third fiber core of the suspended-core fiber is located at an edge of the first air hole, partially exposed to air; and wherein the fourth fiber core of the side-hole fiber is located at a center of a cross section of the side-hole fiber, and a diameter of the second air hole is 50 μm, and a distance between a center of the second air hole and a center of the fourth fiber core is 50 μm.

* * * * *